US008598910B1

(12) United States Patent
Leshchuk et al.

(10) Patent No.: US 8,598,910 B1
(45) Date of Patent: Dec. 3, 2013

(54) TIMESTAMPING LOGIC WITH AUTO-ADJUST FOR VARYING SYSTEM FREQUENCIES

(75) Inventors: John Leshchuk, East Hanover, NJ (US); Joseph A. Manzella, Macungie, PA (US); Walter A. Roper, Lebanon, NJ (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/565,083

(22) Filed: Aug. 2, 2012

(51) Int. Cl.
| H03K 19/00 | (2006.01) |
| H03K 19/20 | (2006.01) |
| H03K 19/094 | (2006.01) |
| H03K 5/08 | (2006.01) |
| H03L 5/00 | (2006.01) |
| H04L 7/00 | (2006.01) |
| H04L 25/00 | (2006.01) |
| H04L 25/40 | (2006.01) |

(52) U.S. Cl.
USPC ............. 326/93; 326/112; 326/127; 327/327; 375/371

(58) Field of Classification Search
USPC ..................... 326/93, 95, 112, 115, 126, 127; 375/371, 316, 346; 327/327, 384
See application file for complete search history.

(56) References Cited

U.S. PATENT DOCUMENTS

| 6,057,789 | A | 5/2000 | Lin |
| 6,128,678 | A | 10/2000 | Masteller |
| 6,400,291 | B1 | 6/2002 | Sankey |
| 6,507,247 | B2 | 1/2003 | Langston |
| 7,558,348 | B1 | 7/2009 | Liu et al. |
| 7,843,946 | B2 * | 11/2010 | Kramer et al. ........... 370/395.62 |
| 2004/0205432 | A1 | 10/2004 | Gage et al. |
| 2005/0083087 | A1 * | 4/2005 | DeMent et al. ............... 327/141 |
| 2007/0172010 | A1 * | 7/2007 | Hilgendorf et al. ........... 375/371 |
| 2011/0320854 | A1 * | 12/2011 | Elrabaa ......................... 713/600 |
| 2012/0030495 | A1 * | 2/2012 | Chandhoke et al. .......... 713/400 |
| 2013/0039359 | A1 * | 2/2013 | Bedrosian ..................... 370/350 |

* cited by examiner

Primary Examiner — Shawki Ismail
Assistant Examiner — Dylan White

(57) ABSTRACT

In described embodiments, a timestamp generator includes a fixed clock domain driven by a fixed frequency clock, a core clock domain, coupled to the fixed clock domain, which is driven by a core clock whose frequency is adjustable during an operation of the timestamp generator. A timestamp logic operating in the core clock domain generates a timestamping output of the timestamp generator. A rate generator operating in both the fixed clock domain and the core clock domain generates per clock cycle increments in the fixed clock domain and transfers carry units from the fixed clock domain into the core clock domain, and a timestamp increment generation of the timestamp logic is clocked by the fixed frequency clock provided by the rate generator. A method for enabling timestamp in an ASIC to be accurate with system clock changes is also described.

20 Claims, 6 Drawing Sheets

TIMESTAMPING LOGIC WITH AUTO-ADJUST FOR VARYING SYSTEM FREQUENCIES

BACKGROUND OF THE INVENTION

1. Field of the Invention

The present invention relates to logic circuits, in particular, to timestamps for clock domains with auto-adjust for varying system frequencies.

2. Description of the Related Art

Application specific integrated circuits ("ASICs") are non-standard, integrated circuits customized for a specific use or application. Generally, an ASIC may contain a very large part of the electronics needed for a consumer product or device on a single integrated circuit (IC, or a "chip"). Many different functional portions of the chip are designed to be operating in a known time relationship to each other, and a given clock signal at one portion of the chip is desirably substantially synchronized with the same clock signal at another portion of the chip. As semiconductor chips grow larger and faster, controlling timing and synchronizing system clock becomes increasingly important. Thus, designing an ASIC with accurate system clock synchronization is critical to successful development.

A timestamp generator in an ASIC system enables timestamping to be accurate with system clock changes. Timestamping can be viewed as a counter that increments at a constant frequency and is used throughout systems to keep processes in synchronization. A conventional timestamp generator is shown in FIG. 1. As shown, timestamp generator 10 includes rate generator 11 that contains carry generator 13, and timestamp logic 12 that has adder 14 and timestamp increment generation portion 15. Timestamp generator 10 splits per clock cycle increment between rate generator 11 and timestamp logic 12. (i.e., timestamp logic 12 deals with the integer portion of per clock cycle increment and rate generate 11 deals with the fractional portion of per clock cycle increment). However, rate generator 11 and timestamp logic 12 operate within a single frequency clock domain 16, which is a variable frequency core clock domain. Thus, as the core clock frequency changes, the amount of timestamp units that the carry and the integer portion of per clock cycle increment represent changes. As such, the time quanta represented by each carry bit is not necessarily a fixed amount.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a timestamp generator including a fixed clock domain driven by a fixed frequency clock, a core clock domain, coupled to the fixed clock domain, which is driven by a core clock whose frequency is adjustable during an operation of the timestamp generator. A timestamp logic operating in the core clock domain generates a timestamping output of the timestamp generator. A rate generator operating in both the fixed clock domain and the core clock domain generates per clock cycle increments in the fixed clock domain and transfers carry units from the fixed clock domain into the core clock domain, and a timestamp increment generation of the timestamp logic is clocked by the fixed frequency clock provided by the rate generator.

In another embodiment, the present invention is a method for enabling timestamp in an application specific integrated circuit (ASIC) to be accurate with system clock changes including receiving a fixed frequency clock signal and an adjustable frequency core clock signal, generating a carry signal having carry bits in a fixed frequency domain and transferring the carry bits from the fixed frequency clock domain to a core clock domain, smoothing out the carry bits, compensating for a static delay, sending the smoothed carry bits to a timestamp logic, generating a timestamping in the timestamp logic that is accurate with system clock changes, and outputting the timestamping to the rest of the ASIC to keep processes synchronized.

In another embodiment, the present invention is a method of providing a circuit including providing a fixed frequency domain that is driven by a fixed frequency clock signal, and providing a core clock domain, coupled to the fixed frequency domain, that is driven by an adjustable frequency core clock signal, wherein a rate generator operating in both the fixed frequency domain and the core clock domain generates a carry and transfers carry bits from the fixed frequency domain to the core clock domain via an asynchronous FIFO logic, wherein the carry bits are smoothed out by an accumulator/smoother logic before sending the carry bits to timestamp logic to generate a timestamping output the circuit.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Described embodiments of the present invention relate to a digital timestamping generator used within systems or processors, in which timestamping is accurate with system clock changes. Timestamp devices operating in accordance with exemplary embodiments of the present invention include a smoothing function which automatically compensates for system clock changes and potential offsets due to system frequency changes. The smoothing function operates independently of a system clock frequency that is greater than a reference frequency. Potential offset circuitry might compensate for static offsets once a new, stable frequency is reached, and such circuitry is employed when a requirement for the absolute timestamp is at a relatively high level of accuracy. The timestamp generator with the smoothing function described herein might be applied to the systems or processors on large scale integrated circuits, such as ASICs, because a timestamp generator operating in accordance with embodiments of the present invention provides a relatively precise timestamp. The accuracy of the timestamp generator of the present invention might be on the order of ±2 ns (nanoseconds).

Note that herein, the terms "carry", "carry unit", "carry bit", "carry output", "carry signal", and "carry information" might be used interchangeably. It is understood that a carry might correspond to, or contain carry information of, a carry unit, carry bit, carry output, or carry signal, and that the carry unit, carry bit, carry output, or carry signal might refer to a carry.

Note that herein, the terms "clock", "clock signal", "frequency clock", and "timing" might also be used interchangeably. It is understood that a clock might correspond to, or relate to a timing signal, a clock signal or a clock frequency, and that the clock signal or clock frequency might refer to a clock or timing.

Hereinafter, embodiments of the present invention are described with reference to the drawings.

Figure 1:
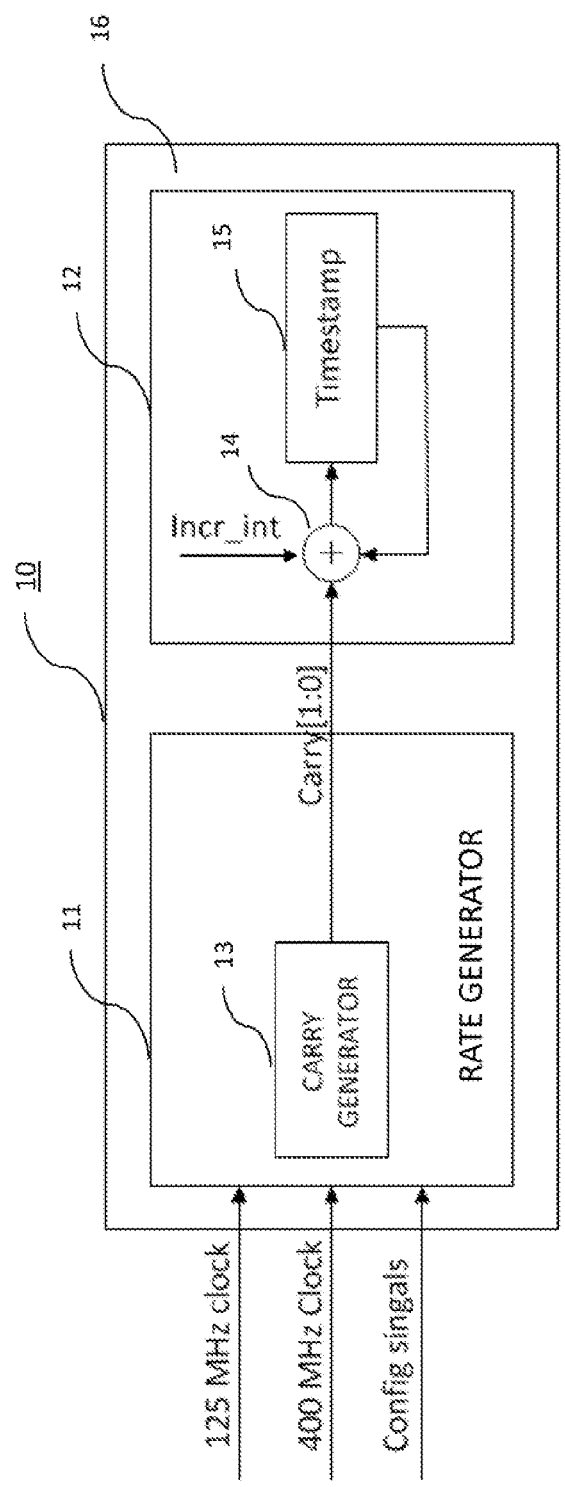
FIG. 1 is a block diagram illustrating a conventional timestamp generator of the prior art.
Figure 2:
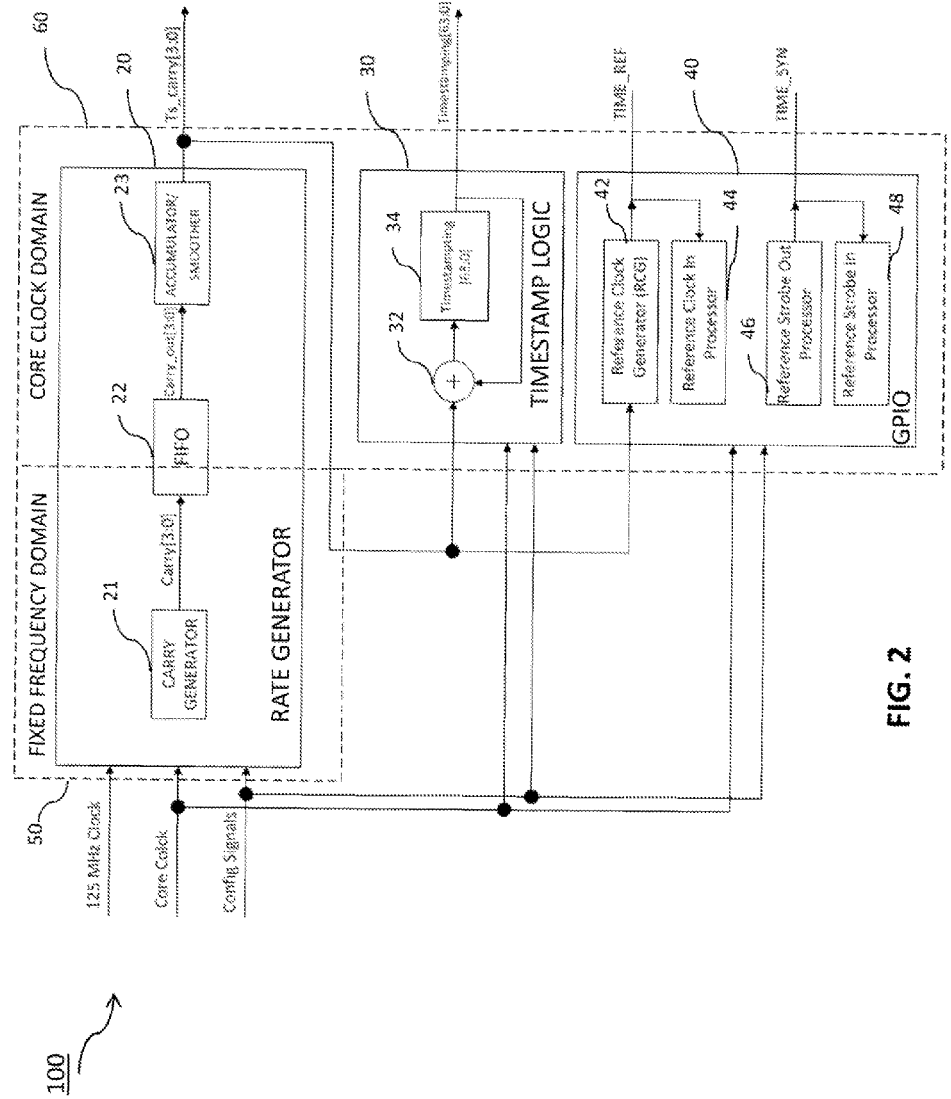
FIG. 2 is a block diagram illustrating a timestamp generator in accordance with an exemplary embodiment of the present invention.

Referring to FIG. 2, a block diagram illustrating a timestamp generator (timestamp generator 100) is shown in accordance with an exemplary embodiment of the present invention.

Timestamp generator 100 might provide a clock function for, for example, ASICs and might be used for representing the timestamping in the ASIC. As shown, timestamp generator 100 includes rate generator (RG) 20, timestamp logic 30 and general purpose input/output logic (GPIO) 40. Timestamp generator 100 also includes two domains, fixed frequency domain 50 and core clock domain 60. Rate generator 20 further includes carry generator 21, clock crossing circuit 22 representing as a first-in first-out logic (FIFO) and accumulator/smoother logic 23. Each element included in timestamp generator 100 will be described below in detail.

Fixed frequency domain 50 might be a reference-like clock operating at a fixed frequency whereas core clock domain 60 might be a core clock whose frequency might be adjusted during system operation. Fixed frequency clock domain 50 might include rate generator 20. Core clock domain 60 might include rate generator 20, timestamp logic 30 and GPIO 40. Thus, rate generator 20 might operate both in fixed frequency domain 50 and core clock domain 60, though rate generator 20 might mainly operate in fixed frequency domain 50. Timestamp logic 30 and GPIO 40 might operate in core clock domain 60. Splitting timestamp generator 100 across two clock domains 50, 60 might allow the carry generation to reside in fixed frequency clock domain 50, and, as such, the carry generation might not be affected by variations of the frequency of the core clock. Thus, as the core clock frequency changes, the amount of timestamp units that the carry and the integer portion of per clock cycle increment representation is fixed, and the time quanta represented by each carry bit might be a fixed amount.

Figure 3:
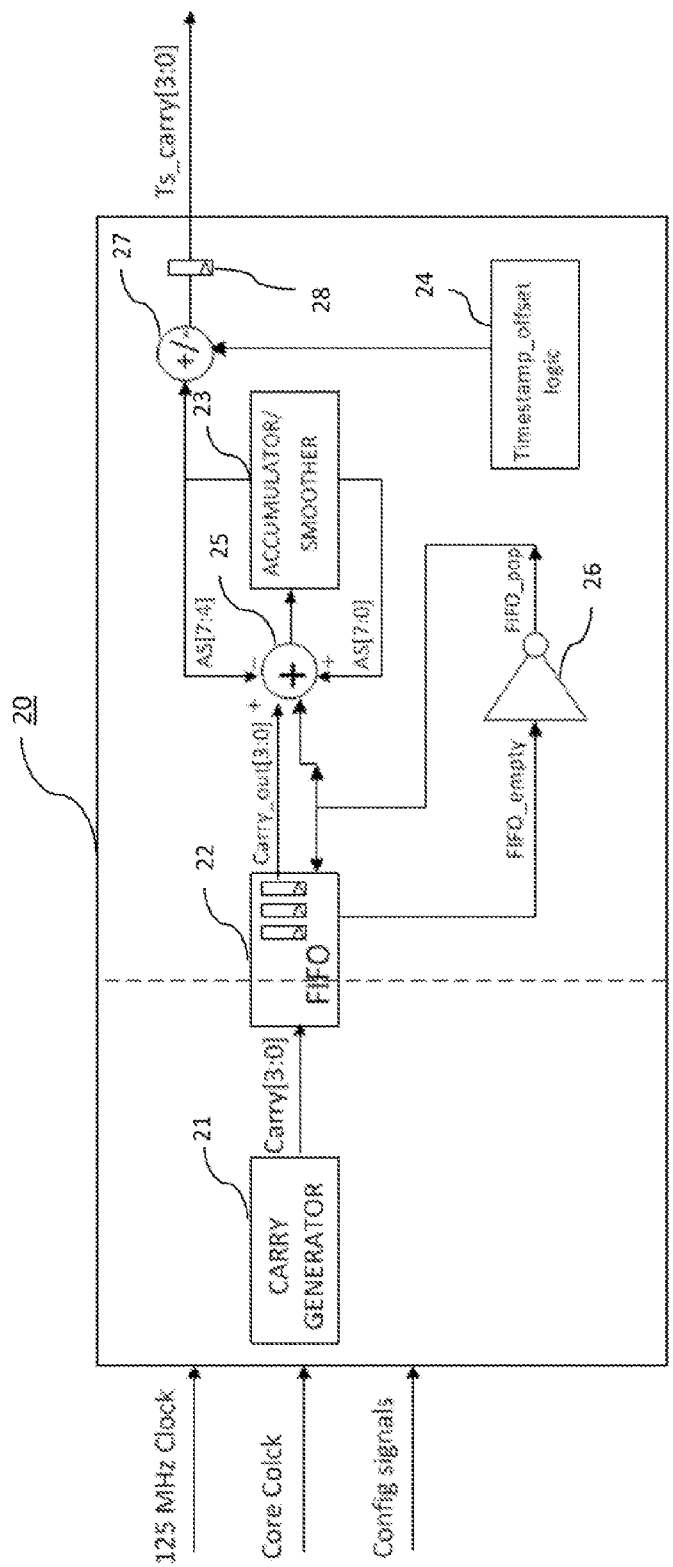
FIG. 3 is a block diagram illustrating a rate generator of the timestamp generator shown in FIG. 2 in accordance with an exemplary embodiment of the present invention.

Rate generator 20 might generate per clock cycle increment of a timestamp in fixed frequency domain 50. Rate generator 20 might also generate a carry and transfer carry bits from fixed frequency domain 50 to core clock domain 60. FIG. 3 is a block diagram illustrating rate generator 20 of timestamp generator 100 shown in FIG. 2 in accordance with an exemplary embodiment of the present invention. As shown, rate generator 20 further includes timestamp offset logic 24, adder 25, invertor 26, mixer 27, and registers 28. The input signal of invertor 26 might be a FIFO_empty signal. The output signal of invertor 26 might be a FIFO_pop signal. Whenever the FIFO_empty signal is asserted into invertor 26, there are no carry units in FIFO 22. Whenever carry generator 21 writes some carry units into FIFO 22, FIFO 22 might become non-empty, and the FIFO_empty signal might be deasserted. Invertor 26 then might assert FIFO_pop which might cause a read of FIFO 22 to occur. The data read out FIFO 22 might be added to the output of accumulator/smoother logic 23 using adder 25. If the value held by accumulator/smoother logic 23 is large enough, then a non-zero value contained in the most significant bits AS[7:4] might be sent out of rate generator 20. Simultaneously, the value AS[7:4] sent out might be subtracted from accumulator/smoother logic 23 using adder 25. Mixer 27 might allow the system to account for offset introduced by accumulator/smoother logic 23.

Timestamp generator 100 might start to operate when receiving input clock signals including a fixed frequency clock signal, a core clock and a configuration signal by rate generator 20. Rate generator 20 might receive as inputs the fixed frequency clock signal, core clock signal and configuration signal. Carry generator 21 might generate a carry signal (shown as "carry") in accordance with the receiving clock signals and provide carry bits to an asynchronous FIFO of clock crossing circuit 22. FIFO might transfer the carry bits from fixed frequency clock domain 50 to core clock domain 60.

Carry generator 21 might be a logic circuit coupled to the FIFO of clock crossing circuit 22. As described above, carry generator 21 might generate the carry of the input frequency clocks in fixed frequency domain 50. As described above, the input clock signals might include the fixed frequency clock signal and the core clock signal. In one embodiment of the present invention, the fixed frequency clock signal might be a 125 MHz signal, and the core clock signal might vary between 400 MHz and 125 MHz. Although the core clock might typically operate at 400 MHz, the core clock frequency might be reduced incrementally down to 125 MHz in order to reduce power consumption. The configuration signals might be gen_incr_frac, gen_incr_frac_den, and gen_incr_int. Gen_incr_frac and gen_incr_frac_den might be a 64-bit integers while gen_iner_int might be an 8-bit integer. Gen_incr_int+gen_incr_frac or gen_incr_int+gen_incr_frac_den might equal the core clock frequency/fixed frequency. As such, the range of values for gen_incr_int might be 1 or 2, while gcn_incr_frac and gen_incr_frac_den might take on almost any value from 1 through $2^{64}-1$. Carry generator 21 might be any existing and emerging carry generator known in the art. In one embodiment of the present invention, carry generator 21 might be embodied with a ripple-carry generator.

Carry generator 21 or rate generator 20 might include a counter which is programmed to increment at a fixed rate. The counter might have an internal accuracy of 64 bits for generating the carry bits which are forwarded to the FIFO. The counter might be incremented every cycle with an increment set such that the carry bits cause the timestamp to increment at an appropriate amount for the fixed frequency clock. In one exemplary embodiment of the present invention, this increment might be approximately 8.096 counts each clock, with the fixed frequency clock of 125 MHz. The integer part (i.e., 8) of the count (i.e., 8.096) in this embodiment might be forwarded through the FIFO of clock crossing circuit 22 to accumulator/smoother logic 23 performing a smoothing function. The carry information might be smoothed out using the smoothing function. The smoothing function might be performed by accumulator/smoother logic 23 in core clock domain 60, described subsequently below.

Clock crossing circuit 22 might be an asynchronous FIFO which might have dual clocks. The FIFO might include an array of registers. In one exemplary embodiment of the present invention, the FIFO might include 3 registers in the side of core clock domain 60 resulting in a time delay of 3 clock cycles. The time delay might cause a time offset which might require compensation. The time offset compensation is described further below. The carry bits generated from carry generator 21 are transmitted as "carryout_out" to accumulator/smoother logic 23 by clock crossing circuit 22. As shown in FIG. 2, the FIFO of clock crossing circuit 22 might cross both fixed frequency domain 50 and core clock domain 60.

Accumulator/smoother logic 23 might be a combination of accumulator logic and a smoother logic in core clock domain 60, as shown in FIG. 2, which might provide a smoothing function to timestamp generator 100 along with the FIFO of clock crossing circuit 22. Accumulator/smoother logic 23 might allow rate generator 20 to smooth out a distribution of the carry bits generated from carry generator 21 in fixed frequency clock domain 50. As the frequency of the core clock domain decreases, a fill of accumulator/smoother logic 23 might increase which might ultimately increase the carry value. The amount of carry units written into accumulator/smoother logic 23 might be fixed, whereas, the amount of the carry units read out of accumulator/smoother 23 might be variable, and is proportional to the fill of accumulator/smoother logic 23. For example, for the fixed frequency of 125 MHz, the amount of the carry units written into accumulator/smoother logic 23 might toggle between 8 and 9 ns.

Accumulator/smoother logic 23 might include a moving average filter that might smooth out a distribution of the carry bits prior to transmitting the carry bits from rate generator 20 to timestamp logic 30. The moving average filter might average over N clock cycles, where N is a positive integer. Accumulator/smoother logic 23 might also be viewed as a counter in which the most significant bits (MSBs) might be used as the carry bits (i.e., AS[7:4] shown in FIG. 3). This operation might automatically compensate for differences in frequency between the fixed frequency clock of 125 MHz of rate generator 20 and the core clock frequency.

Accumulator/smoother logic 23 as designed might create a negative feedback control system. Accumulator/smoother logic 23 might be implemented with any existing and emerging accumulator logic and smoother logic known in the art. An aspect of timestamp generator 100 might be that, as the core clock frequency decreases, accumulator/smoother logic 23 might read out a larger carry value to ensure that accumulator/smoother logic 23 continues to read out 8 ns worth of carries every 8 ns on the core clock side of the FIFO of clock crossing circuit 22 (which might occur if the value of the accumulator increases accordingly). As the value of the accumulator increases, the system delay through the accumulator increases, even though the system delay through the accumulator does not necessarily increase proportionately. The system delay might be a step-wise function as a function of frequency due to, for any given frequency, the carry generally toggles between 2 adjacent integer values. To provide the step-wise function and have the response time relatively fast the value of the accumulator might generally be about 8'hNF, where N=0, 1, 2, etc., F is hexadecimal for the decimal value of 15, N is a variable, and h indicates the value to follow is hexadecimal. 8'hNF is verilog notation for a hexadecimal number with 8 bits of precision. The least significant nibble of the accumulator should generally be approximately 4'hF, allowing the value of the accumulator to toggle between 8'hNF and 8'h(N+1)0, and so producing the carries which toggle between N and N+1.

Figure 4:
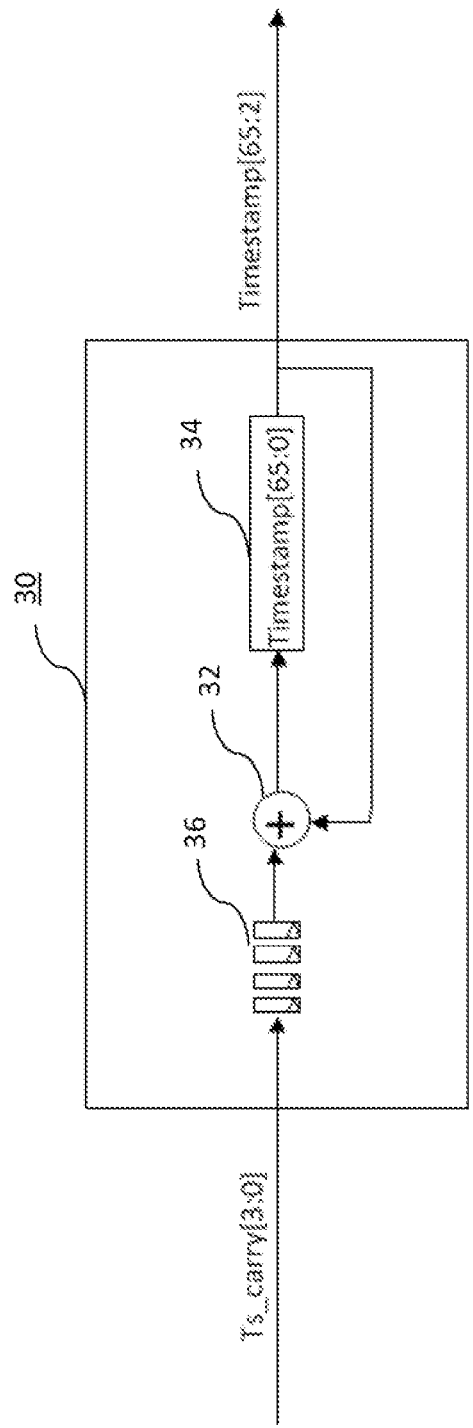
FIG. 4 is a block diagram illustrating a timestamp logic of the timestamp generator shown in FIG. 2 in accordance with an exemplary embodiment of the present invention.

As the core clock frequency decreases, the delay due to the exemplary nine register elements in the carry path of timestamp generator 100 increases accordingly. The nine register elements might be counted as follows. The core clock side of the FIFO of clock crossing circuit 22 in rate generation 20 has the equivalent of three register delays, as shown in FIG. 3. Accumulator/smoother logic 23 might be clocked and thus might also operate as a delay element. The carry output of rate generation 20 might be registered at register 28 before transmission to timestamp logic 30. As such, the total delay of the carry signal output from rate generation 20 might be five clock cycles, which typically corresponds to that of five registers. In one embodiment of the present invention, timestamp logic 30 might have 4 delay elements as shown in FIG. 4 as element 36. Thus, the total delay is substantially equivalent to that of nine register elements.

The timestamp offsets might be calculated as follows.

The system delay of the carry as a function of frequency in nanoseconds (ns) introduced by accumulator/smoother logic 23 and the associated carry pipeline might be given as in relation (1):

$$\text{Delay}(f) = f_1(\text{number of } FFs) + f_2(\text{accumulator}) \quad (1)$$

where $f_1$ might be a function that might equal the number of register delays multiply the time of the core clock, and $f_2$ might be a function that might account for the delay through the accumulator.

These functions might depend on the exact implementation. Depending on the implementation, it might be possible to construct a closed form equation to calculate the delay. However, in most cases, it might be easier to calculate the delay empirically and generate an offset vs. frequency table. A user might then program in the offset for the given operating frequency by doing a table lookup.

In order to calculate the timestamp offset for a frequency $f$ relative to an initial frequency $f_{init}$ (in ns), the time offset might be given as in relation (2):

$$\text{Offset}(f, f_{init}) = \text{Delay}(f) - \text{Delay}(f_{init}) \quad (2)$$

where $f_{init}$ is the initial frequency and $f$ is greater than $f_{init}$.

The offset introduced by accumulator/smoother logic 23 might be compensated for by programming registers of timestamp offset logic 24 with values calculated using relation (2).

Timestamp offset logic 24 might compensate for static offset of the carry bits. Pipeline delays might appear due to the FIFOs in the pipeline. Pipeline delays might appear as a different static delay as clock frequencies change. Timestamp offset logic 24 might compensate for static offset of the carry bits by adding/removing some of the carry bits before the carry bits are sent forward to timestamp logic 30.

FIG. 4 shows a block diagram of timestamp logic 30 in accordance with an exemplary embodiment of the present invention. Timestamp logic 30 includes an array of registers 36, adder 32 and timestamp increment generation portion 34. In one embodiment of the present invention, timestamp increment generation portion 34 might include an internal 66 bit timestamp. As described above, the array of registers 36 might delay the carry by 4 clock cycles prior to adding, by adder 32, to the internal 66 bit timestamp in timestamp increment generation portion 36. Here, 64 most significant bits (MSBs) might be forwarded to the rest of the system and provide a timestamping output timestamp generator 100. As shown in FIG. 2 and FIG. 4, the user might then select whether to use bits [63:0] in FIG. 2 or bits [65:2] in FIG. 4. The Bits [63:0] might provide more precision and accuracy than the bits [65:2].

GPIO 40, as shown in FIG. 2, might include reference clock generator 42 and reference clock in processor 44 that generate a time reference signal to the processor and the rest of the system, and reference strobe out processor 46 and reference strobe in processor 48 that generate a time synchronization signal to the processor and the rest of the system. As shown in FIG. 2, TIME_REF and TIME_SYNC might be configurable input/output signals. When the TIME_REF is configured as an input, reference clock in processor 44 might capture the timestamp generator 100 by Timestamp logic 30 every configured number of clock cycles. When the TIME_REF is configured as an output, reference clock generator 42 might generate a low frequency output clock. When the TIME_SYNC is configured as an input, reference strobe in processor 48 might capture Timestamping[63:0] whenever a rising edge might be detected on the signal TIME_SYNC. When the TIME_SYNC is configured as an output, reference strobe out processor 46 might generate a sync pulse when the user might write a configuration register. As the sync pulse is generator, reference strobe out processor 46 might also capture Timestamping[63:0]. One intention of these signals might be to allow an external reference source to send in synchronization signals into Timestamp generator 100 and then read out the captured timestamps to determine if timestamp generator 100 is synchronized to the external source.

Figure 5:
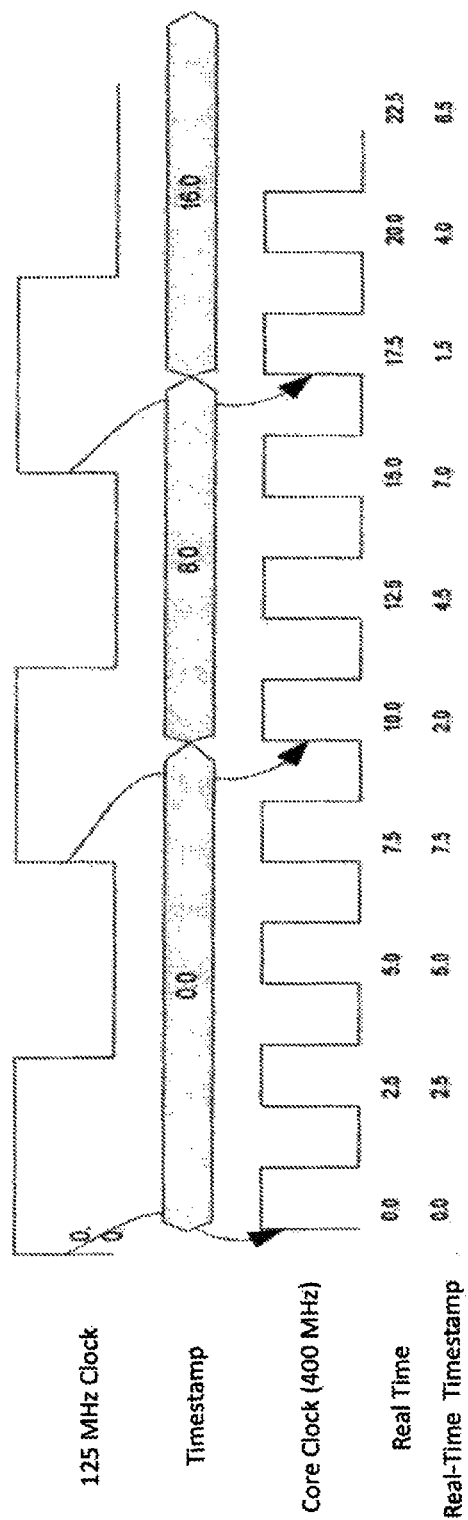
FIG. 5 is a timing diagram illustrating an operation of the time generator shown in FIG. 2 in accordance with an exemplary embodiment of the present invention.

FIG. 5 is a timing diagram illustrating the operation of the time generator shown in FIG. 2 in accordance with the exemplary embodiment of the present invention. At the fixed frequency clock of 125 MHz, the timestamp increments substantially 8 ns each clock cycle. The least significant bit of the timestamp might represent 1/256 μs. However, the resolution of the timestamp might be increased by 2 bits. As such, each carry bit might represent 1/1024 or 0.9765625 ns. Thus, the carry generator might generate 8/0.9765625 or 8.192 carry bits every clock cycle. This might translate into a carry of typically 8, and occasionally 9, carry bits. If these 8 or 9 bits are directly added to the timestamp immediately after reading them out the dual clock FIFO logic of clock crossing circuit 22, the accuracy of the timestamp might be ±4 ns in the core clock domain when the core clock frequency is 400 MHz. FIG. 5 shows the carry transfer from the 125 MHz fixed frequency domain to the core clock domain of 400 MHz. The uncertainty of the clock after the transfer might vary from 0 to 7.5 ns, which might translate into an uncertainty off 7.5/2 or ±3.75 ns. A carry bus to timestamp logic 30 might be increased from 2 to 4 bits. Hence, the value of a carry bit (quantum) might be decreased from 1/256 μs (3.9062 ns) to 1/1024 μs (3.90625/4 ns) or 0.9765625 ns.

Thus, the 8 or 9 carry bits generated by rate generator 20 every 8 ns might be spread out over 3 or 4 of the core clock cycles by accumulator/smoother logic 23. At 400 MHz, timestamp logic 30 might receive a typical carry stream of 3, 3, 2, 3, 3, 2, . . . bits, which might increase the accuracy of the system to about ±1.5 ns. Here, each carry bit might represent 0.9765625 ns, as described above.

For any fixed frequency, accumulator/smoother 23 might be generating carries that toggle between 2 consecutive integers as given below a set of carry integers for a given frequency $$f=\{\text{floor}(T/0.9765625), \text{floor}(T/0.9765625)+1\},$$

where T is the clock period in ns.

Figure 6:
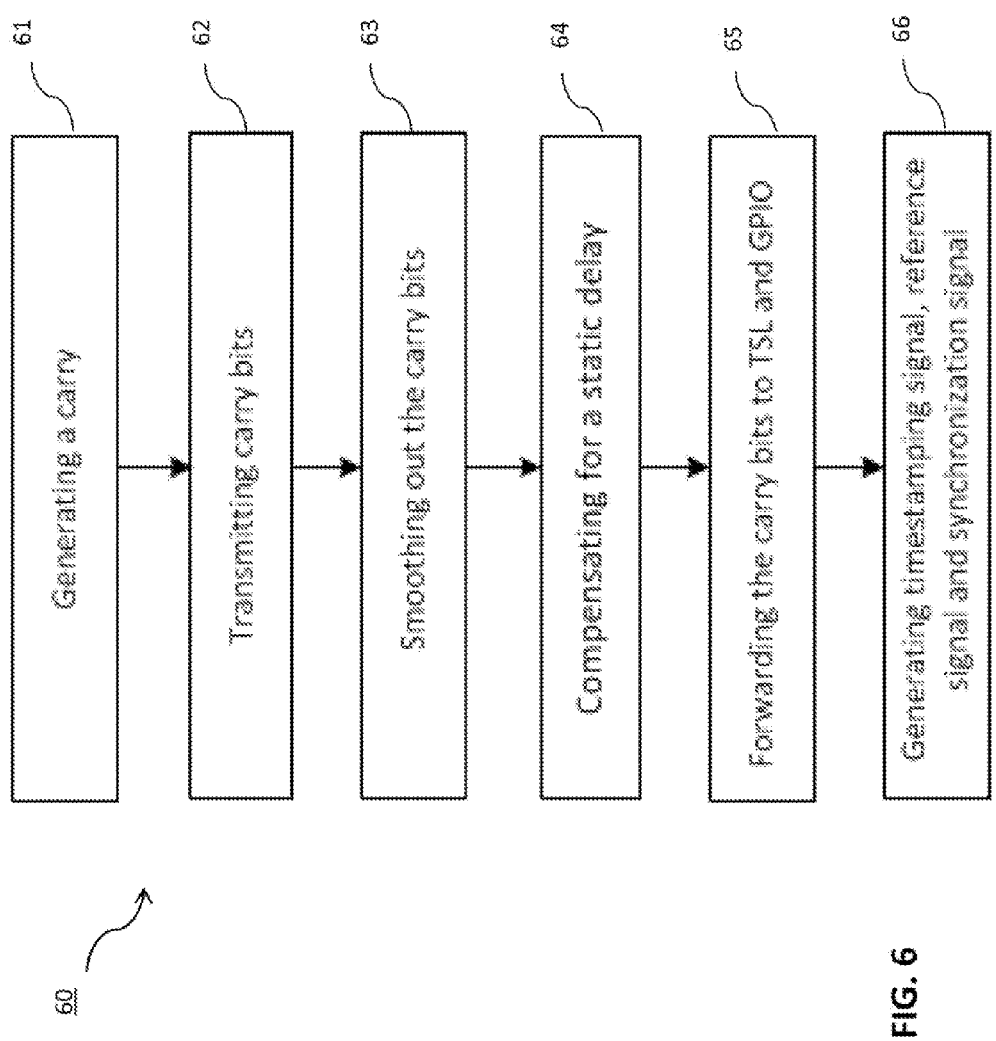
FIG. 6 is a flowchart outlining an exemplary operation of a timestamp generator in accordance with one exemplary embodiment of the present invention.

FIG. 6 is a flowchart outlining an exemplary operation of the timestamp generator shown in FIG. 2 in accordance with the exemplary embodiment of the present invention. It should be appreciated that while FIG. 6 shows a particular order of steps, the present invention is not limited to any particular order in which the steps of FIG. 6 are performed. To the contrary, many of the steps in FIG. 6 may be performed in a different order or even substantially simultaneously without departing from the spirit and scope of the present invention.

As shown in FIG. 6, at step 61, the operation might start by carry generator 21 generating a carry in fixed frequency domain 50 based on a fixed frequency clock signal and a core clock signal. The core clock signal might be incremented based on the fixed frequency clock signal. At step 62, carry bits generated from carry generator 21 might then be transferred for fixed frequency domain 50 into core clock domain 60 via an asynchronous FIFO logic of clock crossing circuit 22. At step 63, accumulator/smoother 23 might receive the carry bits from fixed frequency domain 50 and smooth out a distribution of the carry bits. At step 64, timestamp offset logic 24 might then compensate for a static delay introduced by accumulator/smoother logic 23 by adding/removing some of the carry bits before transmitting the carry bits to timestamp logic 30. At step 65, accumulator/smoother 23 might forward the smoothed carry bits to timestamp logic 30 and general purpose input/output (GPIO) logic 40, respectively. At step 66, timestamp logic 30 might generate a timestamp signal output to the rest part of the system. GPIO might generate a reference signal and a synchronization signal for the system, respectively. The operation of FIG. 6 might be repeated continuously while the processor is operational.

Timestamp generator 100 as described herein might generate the entire per clock cycle increment amount in rate generator 20 in fixed frequency clock domain 50 (see FIG. 2), unlike a conventional timestamp generator 10 that splits the per clock cycle increment between rate generator 11 and timestamp logic 12 in a single clock domain. Furthermore, timestamp generator 100 as described herein might allocate logic between two clock domains, which might allow the carry generation to reside in a fixed frequency domain. As such, the carry generation might not be affected by changes of the core clock frequency. As the core clock frequency changes, the amount of the carry units that the carry and the integer portion of per clock cycle increment represent might be fixed and the time quanta represented by each carry bit might be a fixed amount.

The timestamp generator described in the present invention might be implemented within systems or processors, such as, ASICs, that require timestamping functions. The time generator might be a part of the ASIC to keep processes performed by the ASIC in synchronization. The system, the processor, or the ASIC might be apart of one of a communication device, a wireless telephone, a laptop computing device, a desktop computing device, a server computing device, a toy, a game machine, a game console, a hand-held computing device, a personal digital assistant, etc.

The advantage of the present invention might be a master RG/FIFO/smoother function in rate generator 20 of timestamp generator 100. The master RG/FIFO/smoother function might be logic circuits implemented in an ASIC, where a set of timestamp carry busses might be distributed throughout the ASIC to other modules in the ASIC that require the timestamp. In the field of telecommunications, digital systems often comprise several different ASICs which often cooperate in such a manner that data is transmitted between the different circuits of the various ASICs. In this situation, multiple timestamp generators along with multiple timestamp carry busses might be used in the multiple ASICs to provide improved performance.

While the description herein mainly provides a timestamp generator, as well as a rate generator, used in ASICs, having a smoothing function which automatically compensates for system clock changes and for potential offsets due to system frequency changes as examples, one skilled in the art will understand that many alterations and changes might be made without deviating from the scope of the invention. This description is not to be taken in a limiting sense, but is made merely for the purpose of illustrating the general principles of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "logic", "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled." "directly connected," etc., imply the absence of such additional elements.

No claim element herein is to be construed under the provisions of 35 U.S.C. §112, sixth paragraph, unless the element is expressly recited using the phrase "means for" or "step for."

It will be further understood that various changes in the details, materials, and arrangements of the parts which have been described and illustrated in order to explain the nature of this invention may be made by those skilled in the art without departing from the scope of the invention as expressed in the following claims.

We claim:

1. A timestamp generator comprising:
a fixed clock domain circuit driven by a fixed frequency clock:
a core clock domain circuit, coupled to the fixed clock domain circuit, driven by an adjustable core clock frequency is adjustable during an operation of the timestamp generator;
timestamp logic operating in the core clock domain and adapted to generate a timestamping output of the timestamp generator; and
a rate generator within both the fixed clock domain circuit and the core clock domain circuit,
wherein the rate generator is configured to generate a per clock cycle increment in the fixed clock domain circuit driven by the fixed frequency clock and to transfer carry units from the fixed clock domain circuit to the core clock domain circuit.

2. The timestamp generator of claim 1, wherein the rate generator comprises:
a carry generator configured to generate carry bits of an input clock of the fixed domain circuit;
an asynchronous FIFO configured to transfer the carry bits from the fixed clock domain circuit to the core clock domain circuit;

accumulator/smoother logic, coupled to the rate generator, configured to smooth out the carry bits in the core clock domain circuit before transfer of the carry bits to the timestamp logic; and timestamp offset logic adapted to compensate for a static delay by adjusting one or more of the carry bits before transfer of the carry bits.

3. The timestamp generator of claim 2, wherein the carry generator includes a counter configured to increment at a fixed rate.

4. The timestamp generator of claim 3, wherein the counter is incremented every cycle with an increment set.

5. The timestamp generator of claim 4, wherein the increment set is a count value to toggle between two integers for each clock cycle of the fixed frequency clock in the fixed frequency domain circuit, wherein an integer part of the count is forwarded through the asynchronous FIFO to the accumulator/smoother logic in the core clock domain.

6. The timestamp generator of claim 2, wherein the accumulator/smoother logic includes a moving average filter configured to smooth out the carry bits prior to transfer of the carry bits from the rate generator to the timestamping logic.

7. The timestamp generator of claim 6, wherein the moving average filter averages over N clock cycles, where N is a positive integer.

8. The timestamp generator of claim 2, wherein the accumulator/smoother logic is a counter, where the most significant bits (MSBs) are the carry bits to automatically compensate for differences in frequency between the fixed frequency clock of the rate generator and the core clock frequency.

9. The timestamp generator of claim 1, wherein the fixed frequency clock is 125 MHz and the core clock varies between 400 MHz and 125 MHz.

10. The timestamp generator of claim 1, wherein the timestamping logic (TSL) is a counter incremented based on the carry bits.

11. The timestamp generator of claim 1, wherein the timestamping output from the timestamp generator is applied to an application-specific integrated circuit (ASIC) for synchronization.

12. The timestamp generator of claim 11, wherein the timestamp generator is included in a processor of at least one of a communication device, a wireless telephone, a laptop computing device, a desktop computing device, a server computing device, a toy, a game machine, a game console, a hand-held computing device, or a personal digital assistant.

13. A method for providing timestamping, comprising:
receiving a fixed frequency clock signal and an adjustable frequency core clock signal;
generating a carry signal having carry bits in a fixed frequency domain and transferring the carry bits from the fixed frequency clock domain to a core clock domain;
smoothing out, with accumulator/smoother logic, the carry bits;
compensating for a static delay of the carry bits;
applying the smoothed and compensated carry bits to timestamp logic;
generating the timestamping in the timestamp logic accounting for system clock changes; and
providing the timestamping for synchronization.

14. The method of claim 13, wherein the generating the carry bits includes operating a carry generator of a rate generator in the fixed frequency domain.

15. The method of claim 13, wherein the transferring the carry bits includes employing an asynchronous FIFO to transfer the carry bits from the fixed frequency domain to the core clock domain.

16. The method of claim 13, wherein the providing timestamping provides the timestamping in an application specific integrated circuit (ASIC).

17. The method of claim 13, wherein the generating the timestamping in timestamp logic includes deferring the carry bits before adding the carry bits to an internal timestamp, sending most significant bits forward.

18. A non-transitory machine-readable storage medium, having encoded thereon program code, wherein, when the program code is executed by a machine, the machine implements a method for providing timestamping, comprising the steps of:
receiving a fixed frequency clock signal and an adjustable frequency core clock signal:
generating a carry signal having carry bits in a fixed frequency domain and transferring the carry bits from the fixed frequency clock domain to a core clock domain;
smoothing out, with accumulator/smoother logic, the carry bits;
compensating for a static delay of the carry bits;
applying the smoothed and compensated carry bits to timestamp logic;
generating the timestamping in the timestamp logic accounting for system clock changes; and
providing the timestamping for synchronization.

19. The method of claim 18, wherein the compensating for a static delay of the carry bits comprises:
compensating the static delay introduced by the accumulator/smoother logic using timestamp offset logic before sending the carry bits forward.

20. The method of claim 18, comprising generating, with a rate generator, per clock cycle increments in the fixed frequency domain, thereby the per clock cycle increment is free of changes of the adjustable frequency core clock signal.

* * * * *